US011828383B2

(12) United States Patent
Nagano

(10) Patent No.: US 11,828,383 B2
(45) Date of Patent: Nov. 28, 2023

(54) ELECTROMAGNETIC SWITCHING-VALVE POSITION DETECTION SYSTEM

(71) Applicant: YUKEN KOGYO CO., LTD., Ayase (JP)

(72) Inventor: Taku Nagano, Yokosuka (JP)

(73) Assignee: YUKEN KOGYO CO., LTD., Ayase (JP)

( * ) Notice: Subject to any disclaimer, the term of this patent is extended or adjusted under 35 U.S.C. 154(b) by 641 days.

(21) Appl. No.: 17/051,249

(22) PCT Filed: May 16, 2019

(86) PCT No.: PCT/JP2019/019502
§ 371 (c)(1),
(2) Date: Oct. 28, 2020

(87) PCT Pub. No.: WO2019/221230
PCT Pub. Date: Nov. 21, 2019

(65) Prior Publication Data
US 2021/0262586 A1 Aug. 26, 2021

(30) Foreign Application Priority Data

May 18, 2018 (JP) .................................. 2018-096283

(51) Int. Cl.
*F16K 37/00* (2006.01)
*F16K 31/06* (2006.01)
(Continued)

(52) U.S. Cl.
CPC ...... *F16K 37/0041* (2013.01); *F16K 31/0613* (2013.01); *G01B 7/003* (2013.01); *H01F 7/064* (2013.01); *H01F 2007/1888* (2013.01)

(58) Field of Classification Search
CPC ............. F16K 37/0041; F16K 31/0613; F16K 37/0083; G01B 7/003; H01F 7/064;
(Continued)

(56) References Cited

U.S. PATENT DOCUMENTS 5,942,892 A 8/1999 Li
10,228,076 B2 * 3/2019 Domhan ............. F16K 37/0083
(Continued)

FOREIGN PATENT DOCUMENTS

CN 2687460 Y 3/2005
CN 107850232 A 3/2018
(Continued)

OTHER PUBLICATIONS

Intellectual Property India, "Office Action for Indian Patent Application 202037044736," dated Jul. 29, 2022.
(Continued)

*Primary Examiner* — Giovanni Astacio-Oquendo
(74) *Attorney, Agent, or Firm* — Manabu Kanesaka

(57) ABSTRACT

An electromagnetic switching-valve position detection system includes: an electric current control circuit in which an electric current from a power supply is smoothed to be a direct current, and is turned into a pulse wave alternating current, the pulse wave alternating current being transmitted to the secondary side and outputted as a smoothed direct current; a carrier wave generator configured to superimpose a high frequency carrier wave for position detection on a signal wave of the electric current command; and a detecting unit configured to extract a carrier wave frequency component for the position detection from a voltage feedback signal of the solenoid, detect a voltage amplitude from the frequency component, and obtain an amplitude signal. The control unit has a position determining unit configured to determine a position of the valve spool, and a determination
(Continued)

circuit configured to output a valve position signal based on the determination signal.

12 Claims, 4 Drawing Sheets

(51) Int. Cl.
*H01F 7/06* (2006.01)
*G01B 7/00* (2006.01)
*H01F 7/18* (2006.01)

(58) Field of Classification Search
CPC ....... H01F 2007/1888; H01F 2007/185; H01F 2007/1855
USPC ................................ 324/207.24, 207.11, 200
See application file for complete search history.

(56) References Cited

U.S. PATENT DOCUMENTS

| | | | |
|---|---|---|---|
| 2021/0013810 A1* | 1/2021 | Nagano | H02M 3/33576 |
| 2022/0003334 A1* | 1/2022 | Yasui | G01D 5/243 |

FOREIGN PATENT DOCUMENTS

| | | |
|---|---|---|
| CN | 108011533 A | 5/2018 |
| JP | H05-012703 U | 2/1993 |
| JP | H11-67536 A | 3/1999 |
| JP | H11-153247 A | 6/1999 |
| JP | 2005-286163 A | 10/2005 |
| JP | 2019-134625 A | 8/2019 |

OTHER PUBLICATIONS

PCT/ISA/210, "International Search Report for International Application No. PCT/JP2019/019502," dated Aug. 20, 2019.
PCT/IB/338, "Notification of Transmittal of Translation of the International Preliminary Report on Patentability for International Application No. PCT/JP2019/019502," dated Dec. 3, 2020.
PCT/IB/373, "International Preliminary Report on Patentability for International Application No. PCT/JP2019/019502," dated Nov. 24, 2020.
PCT/ISA/237, "Written Opinion of the International Searching Authority for International Application No. PCT/JP2019/019502," dated Aug. 20, 2019.
China National Intellectual Property Administration, "Office Action and Search Report for Chinese Patent Application 201980032102.2," dated Jun. 23, 2022.

* cited by examiner

ELECTROMAGNETIC SWITCHING-VALVE POSITION DETECTION SYSTEM

RELATED APPLICATIONS

The present application is National Phase of International Application No. PCT/JP2019/019502 filed May 16, 2019, and claims priority from Japanese Application No. 2018-096283, filed May 18, 2018, the disclosure of which is hereby incorporated by reference herein in its entirety.

TECHNICAL FIELD

The present invention relates to a system that detects a spool position with no use of a position detection sensor and detects the position of an electromagnetic switching-valve.

BACKGROUND ART

An electromagnetic switching-valve for use in a hydraulic system is typically a valve in which a moving core is attracted and moved to a fixed core in response to an excitation of a solenoid by carrying a current through the coil, the position of the valve spool interlocked with the moving core is displaced in the axial direction to switch port connection, and the passage of a hydraulic circuit is switched.

Such an electromagnetic switching-valve includes a single solenoid type including one solenoid on one end part side of a valve spool and a double solenoid type including a pair of solenoids on both end sides of a valve spool. In the single solenoid type, a so-called spring offset type is typical in which the number of positions typically is two, and the valve spool is returned to a predetermined position together with the moving core by the biasing force of the spring when the solenoid is in a non-energized state. In the double solenoid type, a solenoid type that has the number of positions which is two with no spring, and a so-called spring centering type that has the number of positions which is three are typical. In the spring centering type, the valve spool is returned to the center position by the biasing force of a pair of springs when the both solenoids are in a non-energized state.

In order to improve the safety of switching, the position of the valve spool is detected using a position detection signal provided by a sensor or a detection mechanism, such as a limit switch and proximity switch.

In order to improve the reliability of switching and moving the valve spool by the solenoid, a detection mechanism or a sensor as described above are necessary. However, the electromagnetic switching-valve is overall inevitably lengthened or upsized due to mounting these components.

Therefore, position detection methods were developed with no sensor possibly leading to such upsizing. For example, Patent Literature 1 discloses a device that determines the position of an armature based on an electrical signal from a solenoid coil, as a device that detects the position of the armature of a magnetic reluctance type electromagnetic actuator with no use of a physical, mechanical position detection device.

This method uses the fact that the impedance of the solenoid is changed depending on the position of the movable armature. In a system having electric current feedback that is effective in a low frequency band, a composite signal formed by superimposing a position detection signal at a frequency higher than a frequency of an electric current command signal on the electric current command signal, is applied to the solenoid, and an alternating component that changes in accordance with a change in the impedance of the solenoid is extracted, and then the position of the armature is determined from the detected electric current amplitude.

CITATION LIST

Patent Literature

Patent Literature 1: Japanese Unexamined Patent Application Publication No. H11(1999)-153247

SUMMARY OF INVENTION

Technical Problem

In the conventional technique, in order to superimpose the detection signal, electric current feedback is imposed on a solenoid load. As a method for superimposing the detection signal, a method is thought in which the detection signal is inputted as a command signal or in which the detection signal is inputted as the disturbance of an electric current loop. In such a system, when the responsiveness and gain of electric current control are improved as much as possible, the detection signal inputted as the command signal is matched with the input, and a change in accordance with the load is absorbed by the system. On the other hand, in the case in which the detection signal is inputted as disturbance, the superimposition signal is attenuated as small as possible. As a result, when it is desired to obtain a superimposition signal that can read a change in the position change, electric current control has to be performed in which the loop gain is low or electric current control has to be performed in which the responsiveness is lower than the responsiveness of the superimposition signal component.

In view of the problems, an object of the present invention is to provide an electromagnetic switching-valve position detection system that can accelerate the speed of the electromagnetic switching-valve by performing electric current control having high enough responsiveness and gains to a solenoid and can detect a detection signal for reading a change in the position of a valve spool without degrading the detection signal.

Solution to Problem

In order to achieve the object, an electromagnetic switching-valve position detection system according to the invention of claim 1 is a system that detects a position of a valve spool of an electromagnetic switching-valve in which a moving core that is attracted and moved to a fixed core by an excitation of an energized solenoid displaces the valve spool to switch a passage of a hydraulic circuit, the system including:
   an electric current control circuit including
      a bridge diode into which an electric current from a power supply flows,
      a primary smoothing capacitor configured to smooth a direct current from the bridge diode,
      a switching transformer configured to transform a pulse wave alternating current which being converted from the direct current smoothed at the primary smoothing capacitor by switching between turning on and off a switching element in a period based on a pulse signal generated by a pulse signal generator, into a predetermined alternating current voltage and transmit the predetermined alternating current voltage to a secondary side, a secondary diode configured to rectify the alternating current transmitted to the secondary side, and a secondary smoothing capacitor configured to further smooth and output the rectified direct current to the solenoid side;

a control unit configured to control switching between turning on and off the switching element, by adjusting a pulse duration of the pulse signal by the pulse signal generator based on an electric current command based on a command signal and based on a detected result on an outputted side of the electric current control circuit;

a carrier wave generator configured to superimpose a high frequency carrier wave for position detection on a signal wave of the electric current command; and a detecting unit configured to extract a frequency component of the carrier wave for the position detection from a voltage feedback signal of the solenoid, detect a voltage amplitude from the frequency component, and obtain an amplitude signal based on the voltage amplitude, the control unit further has a position determining unit configured to determine a position of the valve spool based on the amplitude signal and pre-set determination reference values corresponding to valve spool positions, and a determination circuit configured to output a valve position signal based on the determination signal of the position determining unit.

In the electromagnetic switching-valve position detection system according to claim 1, an electromagnetic switching-valve position detection system according to the invention of claim 2 includes an electric current switching circuit configured to decide a drive current for the solenoid based on the determination signal and the command signal and output an electric current command of the decided drive current.

In the electromagnetic switching-valve position detection system according to claim 1 or 2, in an electromagnetic switching-valve position detection system according to the invention of claim 3, the determination circuit has, as the pre-set determination reference values of the valve spool positions, a fully attracted position reference value corresponding to a threshold of a voltage amplitude when the moving core of the solenoid is reached at a fully attracted position to fixed core, a valve opening position reference value corresponding to a threshold of the voltage amplitude when the valve spool is reached at a valve opening position, and a valve closing position reference corresponding to a threshold of the voltage amplitude when the valve spool is reached at a valve closing position.

In the electromagnetic switching-valve position detection system according to any one of claims 1 to 3, in an electromagnetic switching-valve position detection system according to the invention of claim 4, the determination circuit includes an alarm circuit configured to output an alarm signal when a position of the valve spool is at an abnormal position.

In the electromagnetic switching-valve position detection system according to any one of claims 1 to 4, an electromagnetic switching-valve position detection system according to the invention of claim 5 is a switching detection system including a pair of solenoids of a first solenoid and a second solenoid that have driving directions opposite to each other;

the switching transformer has one primary coil and two secondary coils that are a first secondary coil and a second secondary coil;

the system is provided with a first secondary circuit having a first secondary diode configured to rectify an alternating electric current from the first secondary coil and a first secondary smoothing capacitor configured to further smooth the rectified direct current and output the direct current to the first solenoid, a second secondary circuit having a second secondary diode configured to rectify an alternating electric current from the second secondary coil and a second secondary smoothing capacitor configured to further smooth the rectified direct current and output the direct current to the second solenoid, and a first secondary switching element disposed on the first secondary circuit and a second secondary switching element disposed on the second secondary circuit; and the control unit configured to control switching between drive of the first solenoid and drive of the second solenoid, by controlling the turning on and off the first secondary switching element and the second secondary switching element based on a command signal, and selecting electric current supply by the first secondary circuit or electric current supply by the second secondary circuit.

Advantageous Effects of Invention

According to the electromagnetic switching-valve of the present invention position detection system, a high voltage that is not limited by the primary power supply can be applied to the solenoid by electric current control by the switching transformer power supply method. Thus, the switching speed of the solenoid can be accelerated. Moreover, since the responsiveness of electric current control is improved compared with a system to which the restriction of a power supply voltage is imposed, as a result, a frequency for position detection carrier wave can be high frequencies, and the voltage of the carrier wave component of the solenoid voltage used for position detection can be increased. Accordingly, the signal-to-noise ratio for position detection can be improved. Furthermore, in the case in which the position of the valve spool changes from the attracted position due to disturbance, there is also an effect that can prevent the passage of the electromagnetic switching-valve from being switched to closing, by increasing the solenoid electric current at high speed using the time difference until the passage is substantially changed.

BRIEF DESCRIPTION OF DRAWINGS

FIGS. 3(a) to 3(d) are illustrations showing examples of drive control of the electromagnetic switching-valve by the electromagnetic switching-valve position detection system according to the practical example, wherein FIGS. 3(a) to 3(d) are time chart diagrams showing switching states of drive currents corresponding to determination results in which valve spool positions are different.

DESCRIPTION OF EMBODIMENTS

Figure 1:
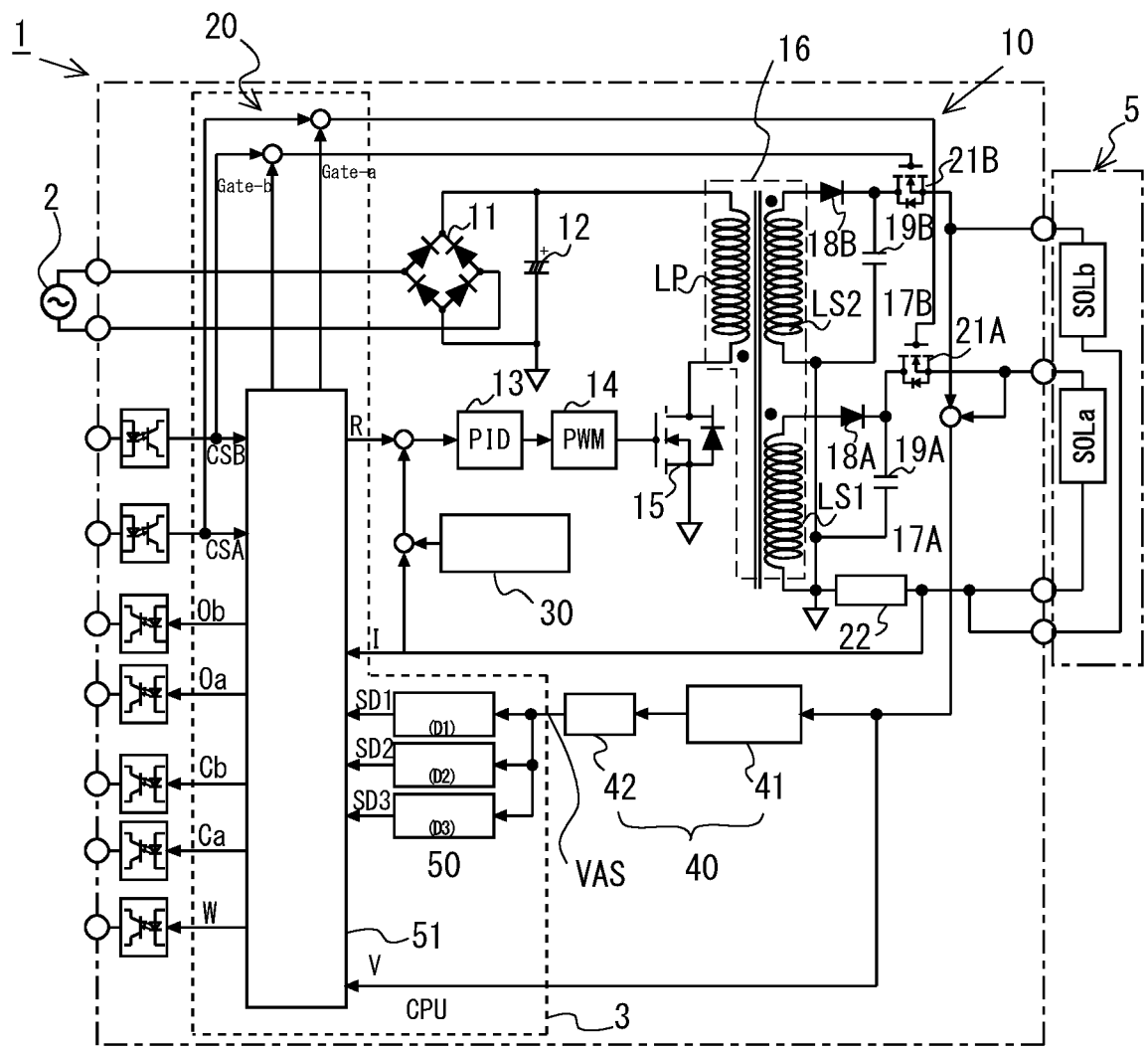
FIG. 1 is a schematic circuit diagram showing the configuration for controlling an electromagnetic switching-valve that is a double solenoid type with one pair of solenoids as an electromagnetic switching-valve position detection system according to a practical example of the present invention.

An electromagnetic switching-valve position detection system according to the present invention is a position detection system for an electromagnetic switching-valve in which a moving core that is attracted and moved to a fixed core by an excitation of an energized solenoid displaces a valve spool to switch a passage of a hydraulic circuit, the system including: an electric current control circuit including a bridge diode configured to rectify an electric current flowing from a power supply when the current is an alternating current and depolarize an electric current flowing from the supply power when the current is a direct current, a primary smoothing capacitor configured to smooth the direct current from the bridge diode, a switching transformer configured to transform a pulse wave alternating current which being converted from the direct current smoothed at the primary smoothing capacitor by switching between turning on and off of a switching element in a period based on a pulse signal generated by a pulse signal generator, into a predetermined alternating current voltage and transmit the predetermined alternating current voltage to a secondary side, a secondary diode configured to rectify the alternating current transmitted to the secondary side, and a secondary smoothing capacitor configured to further smooth and output the rectified direct current to a solenoid side; a control unit configured to control (PWM control) switching between turning on and off the switching element by adjusting a pulse duration of the pulse signal by the pulse signal generator based on an electric current command based on a command signal and based on a detected result on an outputted side of the electric current control circuit; a carrier wave generator configured to superimpose a high frequency carrier wave for position detection on a signal wave of the electric current command; and a detecting unit configured to extract a frequency component of the carrier wave for the position detection from a voltage feedback signal of the solenoid, detect a voltage amplitude from the frequency component, and obtain an amplitude signal based on the voltage amplitude. The control unit further has a position determining unit configured to determine a position of the valve spool based on the amplitude signal and pre-set determination reference values corresponding to valve spool positions, and a determination circuit configured to output a valve position signal based on the determination signal of the position determining unit.

With the configurations above, in the present invention, first, the solenoid is not directly on/off controlled. In the primary side of the electric current control circuit, the voltage from the power supply is on/off controlled at a high frequency based on the electric current command from the control unit, and alternating-current power is transmitted to the secondary side, rectified, smoothed, and then outputted. Thus, to the solenoid, a drive voltage with no turning on/off is supplied. Moreover, the secondary side voltage of the transformer is determined by the wire turn ratio between the primary coil and the secondary coil and the PWM duty ratio (on-time pulse duration/PWM period). Thus, since a given application voltage to a load is obtained regardless of the original power supply voltage, the application voltage to the solenoid can be easily increased in the drive of the electromagnetic switching-valve with no increase in noise or losses, the switching speed on-time can be accelerated. And in turning off, the application of a backward voltage can accelerate the speed.

Therefore, in the present invention, electric current feedback control is possible in which the responsiveness of the electric current to the solenoid is sufficiently high by a method in which the switching transformer is directly controlled by the electric current control circuit in the power supply side and electric power necessary for the requested solenoid electric current can be supplied at high speed. Thus, the carrier wave voltage of the solenoid that is the source of position detection superimposed on the electric current command can be increased, the position of the valve spool can be detected simply and efficiently at low cost, and the switching state of the electromagnetic switching-valve can be accurately grasped, which are usable for the drive control of the electromagnetic switching-valve.

That is, the high frequency carrier wave for position detection is superimposed on the electric current command, the voltage amplitude of the carrier wave frequency component for position detection is detected from the outputted side voltage of the solenoid, and the position of the valve spool can be detected and determined based on the amplitude signal of the voltage amplitude and the predetermined determination reference value corresponding to the voltage amplitude in accordance with a position of the moving core of the solenoid. The determination positions to be referenced are the position at which the fully attracted state of the moving core is obtained and the valve opening position and the valve closing position of the valve spool, the determination reference values preset corresponding to the positions are compared with the detected amplitude signal, and hence the situations of the valve position of the electromagnetic switching-valve can be determined.

Figure 5:
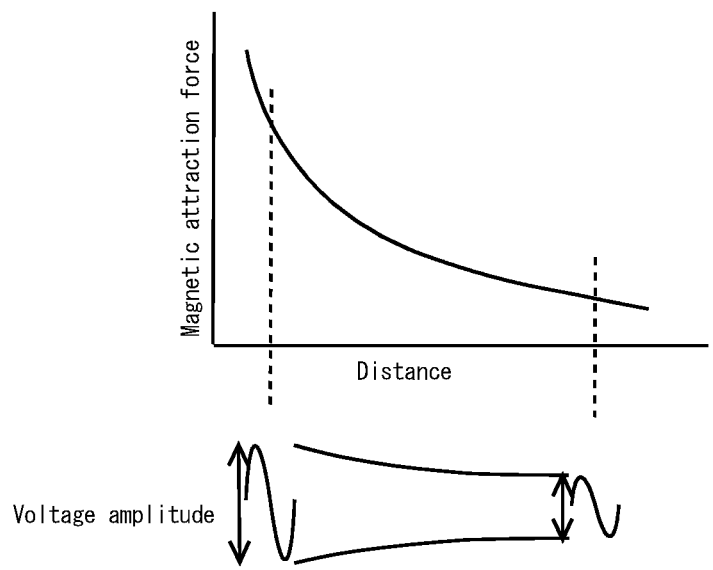
FIG. 5 is an illustration showing the relationship between the distance of the moving core of the solenoid and the impedance, and the displacement in the voltage amplitude of the solenoid to this relationship.

Specifically, as shown in FIG. 5, since the attraction in the solenoid is decreased in accordance with the distance of the moving core from the fixed core and the voltage amplitude of the solenoid is also decreased, the position of the valve spool can be determined by detecting the voltage amplitude of the solenoid based on the relationship obtained in advance between the position of the valve spool corresponding to the position of the moving core and the voltage amplitude.

Therefore, the position determining unit may include, as determination reference values, at least reference values, a fully attracted position reference value corresponding to a threshold of the voltage amplitude when the moving core of the solenoid is reached at the fully attracted position to the fixed core, a valve opening position reference value corresponding to a threshold of the voltage amplitude when the valve spool is reached at the valve opening position, and a valve closing position reference value corresponding to a threshold of the voltage amplitude when the valve spool is reached at the valve closing position. When the detected amplitude signal is the fully attracted position reference value or more, it can be determined that the moving core reaches the fully attracted state, when the amplitude signal is the valve opening position reference value or more, it can be determined that the valve spool is at the valve opening position, and when the amplitude signal is the valve closing position reference value or less, it can be determined that the valve spool is at the valve closing position.

In the present invention, the electromagnetic switching-valve may be automatically controlled by switching the drive current to the solenoid based on this determined result. That is, the determination circuit may include an electric current switching circuit configured to decide a drive current to be outputted to the solenoid based on the determination signal from the position determining unit and the command signal and output an electric current command of the decided drive current.

For example, an electric current command to supply a large drive current at the rising edge is outputted using a drive command signal to achieve a valve opening state to the solenoid. At the point in time when the determination signal indicating that the moving core is at the fully attracted position and the determination signal indicating that the valve spool is at the valve opening position are obtained, the electric current switching circuit outputs an electric current command to select and switch to an electric current amount equal to or below a rated current. Thus, the determination circuit can achieve an energy saving state by decreasing the drive current without reducing the maximum flow rate. With drive control in such an energy saving state, the self-heating of the valve itself may be decreased.

Moreover, according to the present invention, since a large drive current can be supplied by the electric current control circuit according to the switching transformer power supply circuit method as described above, the electromagnetic switching-valve can be switched even in the state in which switching is difficult more or less, and the electromagnetic switching-valve of high contamination resistance in which contaminants hardly remain in the valve can be formed.

The electromagnetic switching-valve can be switched after the moving core of the solenoid is in the fully attracted state. However, since a large electric current applied at the rising edge is typically switched to a reduced electric current simply after the set time of the timer, a valve switching is performed even in the state in which the attraction state of the moving core is not obtained, and as a result, a switching failure might occur. In the present invention, it is enabled that after the fully attracted state of the moving core is confirmed from the determined result, the valve switching is then performed, and hence a switching failure is advantageously avoided.

Even though the position of the moving core is changed due to disturbance (hydraulic force and vibrations) in the energy saving state, when the determination signal indicating that the valve spool is at the opening position is being obtained whereas the determination signal indicating that the moving core is at the fully attracted position is no longer obtained, the electric current command to increase again the electric current is outputted, and hence the valve spool can be prevented from reaching the valve closing position due to disturbance.

From the determined result, an abnormal position can be detected, such as the case in which the valve spool is present in the middle that is neither the valve opening position nor the valve closing position, and in addition, the case in which the moving core is out of the fully attracted state, or the case in which the fully attracted state is not obtained by carrying a current through the solenoid for excitation, and hence a configuration may be possible in which an alarm circuit is included to output an alarm signal indicating these abnormalities. Additionally, a configuration may be possible in which a signal indicating each state is outputted when the valve spool is present at the valve opening position or the valve closing position.

In the present invention, since the voltage of the solenoid is detected, a configuration may be possible in which in the determination circuit, a temperature change based on a change in the voltage is estimated, the change is detected when an abnormality occurs, and the detection is outputted as an alarm signal. For example, a configuration may be possible in which the temperature of the solenoid is estimated from a voltage rise, and abnormal heat generation is detected and alarmed. In the case in which a voltage change is increased not less than the temperature change of the load resistance, a line break alarm signal may be outputted, whereas in the case in which a voltage change is decreased, a short circuit alarm signal may be outputted as an alarm. The determination may be possible whether valve switching is normal from the estimated temperature and switching time, and an alarm signal can be outputted when an abnormality is determined. For example, since in the switching valve of the hydraulic circuit, switching time is varied in accordance with the temperature of hydraulic oil, the determination can be made whether it is normal or abnormal depending on whether switching time is in an appropriate range suitable for the temperature.

As the electromagnetic switching-valve according to the present invention, a single solenoid type and a double solenoid type are possible. When the electromagnetic switching-valve is a single solenoid type, a solenoid subjected to drive control is one, whereas when the electromagnetic switching-valve is a double solenoid type, electric current supply has to be switch-controlled for a pair of solenoids that are driven in the reverse direction. In this case, a configuration is provided for the electric current control circuit in which an electric current can be selectably and switchably supplied to the first solenoid and the second solenoid.

That is, as the switching transformer of the electric current control circuit, the switching transformer has one primary coil and two secondary coils that are a first secondary coil and a second secondary coil. The electric current control circuit is provided with a first secondary circuit having a first secondary diode configured to rectify an alternating electric current from the first secondary coil and a first secondary smoothing capacitor configured to further smooth the rectified direct current and output the direct current to the first solenoid, a second secondary circuit having a second secondary diode configured to rectify an alternating electric current from the second secondary coil and a second secondary smoothing capacitor configured to further smooth the rectified direct current and output the direct current to the second solenoid, and a first secondary switching element disposed on the first secondary circuit and a second secondary switching element disposed on the second secondary circuit. The control unit controls switching between drive of the first solenoid and drive of the second solenoid, by controlling the turning on and off the first secondary switching element and the second secondary switching element based on a command signal, and selecting electric current supply by the first secondary circuit or electric current supply by the second secondary circuit.

Note that in the configuration of the secondary circuit of the electric current control circuit in the electromagnetic switching-valve position detection system according to the present invention, a flyback converter type in which the polarity of the secondary coil to the primary coil is the reverse direction is convenient. However, the configuration of a forward converter in which the polarity of the secondary coil is the same as the polarity of the primary coil and a choke coil and a commutation diode are included may be possible.

The electromagnetic switching-valve position detection system according to the present invention can be combined, as a controller, with existing electromagnetic switching-valves, and an electromagnetic switching-valve that can simply detect the position can be constructed with no increase in size.

EXAMPLE

Figure 2:
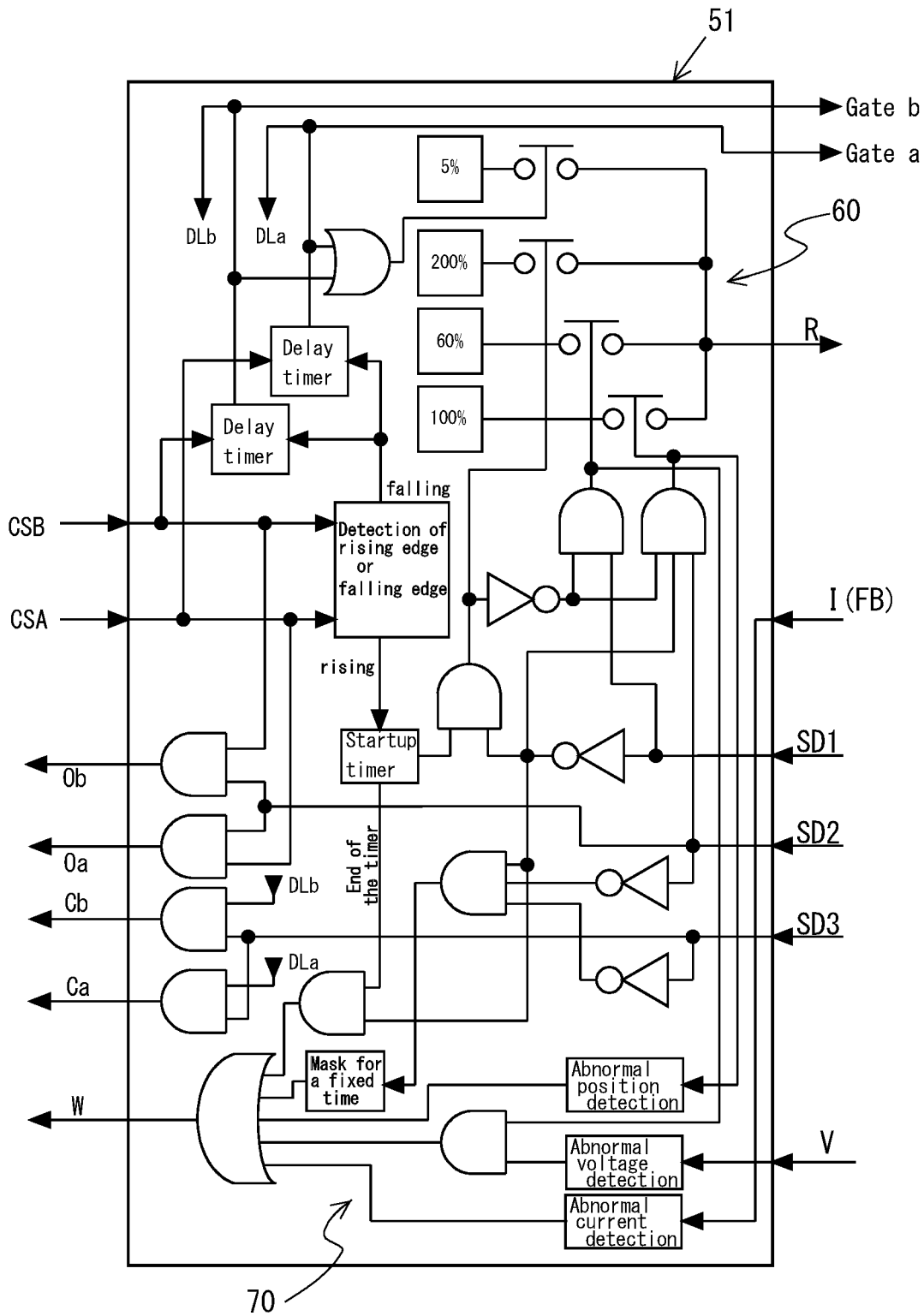
FIG. 2 is a circuit diagram showing the detail of a determination circuit in FIG. 1.

As an electromagnetic switching-valve position detection system according to a practical example of the present invention, the configuration of controlling an electromagnetic switching-valve that is a double solenoid type including a pair of solenoids is shown in a schematic circuit diagram that is FIG. 1. FIG. 2 is a circuit diagram showing the detail of a determination circuit in FIG. 1. FIGS. 3(a) to 3(d) are illustrations showing examples of drive control of the electromagnetic switching-valve by a controller according to the practical example, wherein FIGS. 3(a) to 3(d) are time chart diagrams showing switching states of drive currents corresponding to determination results in which valve spool positions are different. FIG. 4 is a conceptual diagram showing the procedures of determining a valve spool position by the electromagnetic switching-valve position detection system according to the practical example.

An electromagnetic switching-valve position detection system 1 of this practical example having an electric current feedback control system in which according to an electric current command R based on a solenoid drive command signal (CSA/CSB) from a control unit 3, an electric current from a power supply is supplied to a solenoid 6 of an electromagnetic switching-valve 5 through an electric current control circuit 10 at a drive voltage with no turning on/off. In the electric current feedback control system, as shown in a conceptual diagram in FIG. 4, a high frequency wave for position detection from a carrier wave generator 30, e.g. a carrier wave (a sine wave or a triangular wave) f1 ranging from 0.1 to 1 kHz, is superimposed on the signal wave of the electric current command R. At a detecting unit 40, a carrier wave frequency component is extracted from a voltage V of the solenoid 6 through a band-pass filter 41, a positive voltage amplitude is detected through a full-wave rectifier 42, an obtained amplitude signal VAS is outputted to a position determining unit 50, and the position of the valve spool is determined at this position determining unit 50.

As a more detailed configuration, as shown in FIGS. 1 and 2, the electric current control circuit 10 includes a bridge diode 11 configured to rectify an electric current from a supply power source 2 when the current is an alternating current and depolarize an electric current from the supply power source 2 when the current is a direct current, a primary smoothing capacitor 12 configured to smooth the direct current from the bridge diode 11, a primary switching element (MOSFET) 15 configured to convert the direct current smoothed at the primary smoothing capacitor 12 into a pulse wave alternating current by switching between turning on and off in a period based on a pulse signal generated by a pulse signal generator 14, and a switching transformer 16 configured to transform the pulse wave alternating current into a predetermined voltage to transmit the voltage from a primary coil LP to a secondary coil. The alternating current transmitted to the secondary side is rectified at a secondary rectifier diode, and the rectified direct current is further smoothed at a secondary smoothing capacitor, and then delivered to a pair of solenoids (SOLa, SOLb) of the electromagnetic switching-valve 5.

In this practical example, the switching transformer 16 includes two secondary coils (LS1, LS2) for one primary coil (LP), coil polarity of the two secondary coils is different from the primary coil. In the secondary side, electric current supply is switched between the pair of solenoids from the secondary coils (LS1, LS2). That is, the first secondary coil LS1 is connected to the first solenoid SOLa by a first secondary circuit 17A, and the second secondary coil LS2 is connected to the second solenoid SOLb by a second secondary circuit 17B.

The first secondary circuit 17A includes a first secondary diode 18A configured to rectify the alternating current transmitted from the primary coil LP to the first secondary coil LS1 and a first secondary smoothing capacitor 19A configured to further smooth the rectified direct current to deliver the direct current to the first solenoid SOLa. Similarly, the second secondary circuit 17B includes a second secondary diode 18B configured to rectify the alternating current transmitted to the second secondary coil LS2 and a second secondary smoothing capacitor 19B configured to further smooth the rectified direct current. The first and the second secondary circuits (17A, 17B) respectively include a secondary switching elements (21A, 21B) formed of a MOSFET, for example, at positions at which a line is interrupted on the high voltage side to the solenoids (SOLa, SOLb).

From the deviation from the target value based on the electric current command R and an electric current feedback signal I according to the detected result by an electric current sensor 22 on the outputted side, an actual manipulated variable is determined through a PID (Proportional Integral Differential) control unit 13, and an amplitude signal corresponding to the manipulated variable is generated, and outputted to the pulse signal generator 14. However, the signal wave of the electric current command R is superimposed in advance with a high frequency carrier wave f1 for position detection, as described above. The on/off control of the primary switching element 15 is performed using the pulse signal from the pulse signal generator 14, and hence the primary side of the switching transformer 16 is subjected to PWM control.

The control unit 3 is provided with a solenoid switching circuit 20 configured to control switching between turning on and off to the first secondary switching element 21A and the second secondary switching element 21B based on the command signal. According to a signal from the solenoid switching circuit 20, electric current supply to the first solenoid SOLa from the first secondary coil LS1 by the first secondary circuit 17A and electric current supply to the second solenoid SOLb from the second secondary coil LS2 by the second secondary circuit 17B are switched, the solenoid to be driven thereby is switched, and the driving direction of the valve spool is the inverted orientation.

Therefore, the detection of the voltage amplitude and the determination of the position of the valve spool are performed on one solenoid to which a drive command is outputted. As the determination positions of the valve spool, the fully attracted position of the moving core and the valve opening position and the valve closing position of the valve spool are set. A determination reference value set to the position determining unit 50 accordingly consists of three values, a fully attracted position reference value D1 corresponding to the threshold of the voltage amplitude in the case in which the moving core of the solenoid is reached at the fully attracted position to the fixed core, a valve opening position reference value D2 corresponding to the threshold of the voltage amplitude in the case in which the valve spool is reached at the valve opening position, and a valve closing position reference value D3 corresponding to the threshold of the voltage amplitude in the case in which the valve spool is reached at the valve closing position.

Note that in the case in which the electromagnetic switching-valve 5 is a three-position valve, the center position of the valve spool is a shared valve closing position, and the valve opening position of the valve spool by the drive of the first solenoid SOLa is different from the valve opening position of the valve spool by the drive of the second solenoid SOLb. However, since the moving distances of the moving core and the valve spool to the valve opening positions are generally the same even though the pressing driving directions by the moving core are opposite to each other, the voltage amplitude corresponding to the distance and the voltage amplitude of the reference value can be set as in common. Therefore, even in either of the solenoid drives, the position of the valve spool can be determined based on the three common reference values (D1, D2, D3).

In this practical example, as shown in FIG. 2, the determination circuit 51 includes an electric current switching circuit 60 configured to switch between four kinds of drive currents based on the determined result of the position of the valve spool and output the electric current command R. That is, to a normal drive current at 100%, a large electric current to be supplied by the electric current switching circuit 60 at the rising edge is 200%, the energy saving drive current is 60%, and a low electric current for position detection is 5%, an electric current is selected from these current corresponding to determination signals (SD1, SD2, SD3) for switching, and then the electric current command R of the selected current can be outputted. However, the drive current in each stage is not limited to these settings. According to the electric current control circuit 10 of the practical example, the drive current for each stage can be freely set, for example, a large electric current for accelerating the speed at the rising edge can be set to 300%.

Furthermore, a configuration is provided in which an alarm circuit 70 outputs an abnormality alarm signal W in the case in which an abnormality is determined from the determined result of the valve spool position. Cases that are determined as abnormal are when the moving core is out of the fully attracted state, or when the moving core is not reached in the fully attracted state even after a lapse of a certain time period from the output of the solenoid drive command, i.e., the first solenoid drive command signal CSA or the second solenoid drive command signal CSB. And an abnormality is also determined when the valve spool is stood between the opening position and the valve closing position. In addition, a configuration is provided in which valve position signals in the solenoids drives of the electromagnetic switching-valve 5, i.e., a valve opening signal Oa or a valve closing signal CSa in the first solenoid or a valve opening signal Ob or a valve closing signal Cb in the second solenoid are also outputted.

Referring to FIGS. 3(*a*) to 3(*d*), examples of position detection and electric current control in driving one solenoid of the electromagnetic switching-valve 5 that is a double solenoid type by the electromagnetic switching-valve position detection system 1 including the configurations above according to the practical example will be described.

For example, in the time chart in FIG. 3(*a*), upon outputting a drive command signal (CSA or CSB) corresponding to one solenoid in order to switch the electromagnetic switching-valve to one valve opening position so that the passage of the hydraulic circuit is switched, in the control unit 3, the electric current command R indicating the drive current at 200% is outputted in response to the signal at the rising edge, and time enters a high-speed section HS in which a supply electric current is 200%. After the moving core is attracted and moved to the fixed core by an excitation of the energized solenoid, and at the same time, the valve spool is also pressed and moved to reach the valve opening position, the signal of the voltage amplitude of the solenoid to be detected reaches the valve opening position reference value D2, thereby, it is determined that the valve spool is in the valve opening position, and the determination signal SD2 indicating the determined result is outputted to the determination circuit 51. The determination circuit 51 outputs the valve opening signal (Oa/Ob). After the moving core reaches the fully attracted state, the signal of the voltage amplitude of the solenoid to be detected reaches the fully attracted position reference value D1, thereby, it is determined that the moving core is in the fully attracted state, and the determination signal SD1 indicating the position determined result is outputted to the determination circuit 51.

Upon obtaining the determination signal SD2 indicating that the valve spool is at the valve opening position and the determination signal SD1 indicating that the moving core is in the fully attracted state, the determination circuit 51 outputs the electric current command R that switches the drive current to the energy saving mode to the electric current control circuit 10. Here, the energy saving mode is the drive current at 60%. Generally, when no abnormality occurs, the energy saving section ES continues until the output of the solenoid drive command signal (CSA/CSB) is stopped.

However, in the case in which the moving core has moved away from the fully attracted position due to disturbance, for example, as shown in the chart in FIG. 3(*a*), the signal of the voltage amplitude of the solenoid to be detected becomes smaller than the fully attracted position reference value D1, and the determination circuit 51 fails to obtain the determination signal SD1. The determination circuit 51 determines this as the determined result indicating the out of the fully attracted state, and outputs the electric current command R to switch to the drive current at 100% here such that the drive current is increased from the energy saving mode. At the same time, the alarm circuit 70 outputs the alarm signal W showing the state in which the moving core is out of the fully attracted state.

As described above, since the state can be detected in which the moving core is out of the fully attracted state, the moving core can again achieve the fully attracted state before the valve spool is out of the valve opening position by increasing the drive current as a quick response. After the signal of the voltage amplitude of the solenoid to be detected again exceeds the fully attracted position reference value D1 and the determination signal SD1 is outputted, the determination circuit 51 can output the electric current command for switching the drive current to 60% and entering the energy saving section ES again.

After the solenoid drive command signal (CSA/CSB) of the electromagnetic switching-valve 5 is turned to off, the drive current is also turned to 0%. After the attraction of the moving core to the fixed core is released and the moving core is away from the fixed core, at the same time, the valve spool is also returned from the valve opening position. Accordingly, the signal of the voltage amplitude of the solenoid to be detected becomes smaller than the fully attracted position reference value D1 and the valve opening position reference value D2, and the value is zero in the state is achieved in which no current is carried through the solenoid for no excitation. Although the valve spool is supposed to be returned at the valve closing position, in order to confirm the valve closing state (VC) after a lapse of a certain time period, the determination circuit 51 outputs the electric current command R to supply a low electric current, the drive current at 5% here. When the signal of the voltage amplitude of the solenoid to be detected by this low current supply is smaller than the valve closing position reference value D3, it is determined that the valve spool is at the valve closing position, and the determination signal SD3 is outputted to the determination circuit 51. The determination circuit 51 outputs the valve closing signal (Ca/Cb) showing the valve closing state, and turns off the drive current.

As described above, since the position of the valve spool of the electromagnetic switching-valve 5 or the attraction state of the moving core is more simply determined by the detection of the voltage amplitude of the solenoid, an excellent valve switch control can be performed in an immediate response even though the influence due to disturbance occurs.

Figure 3A:
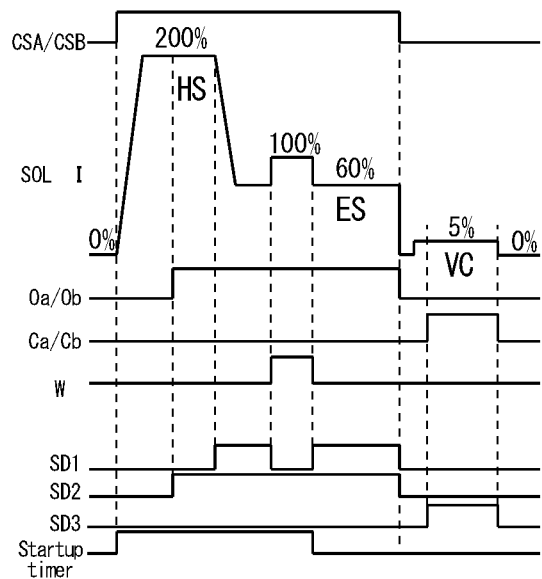
Figure 3B:
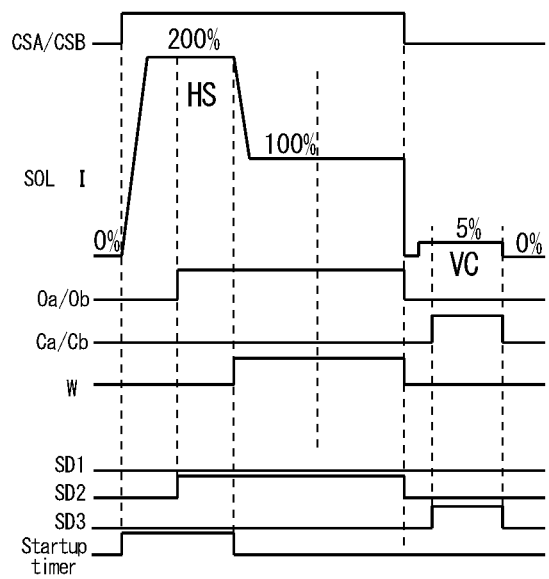
Figure 4:
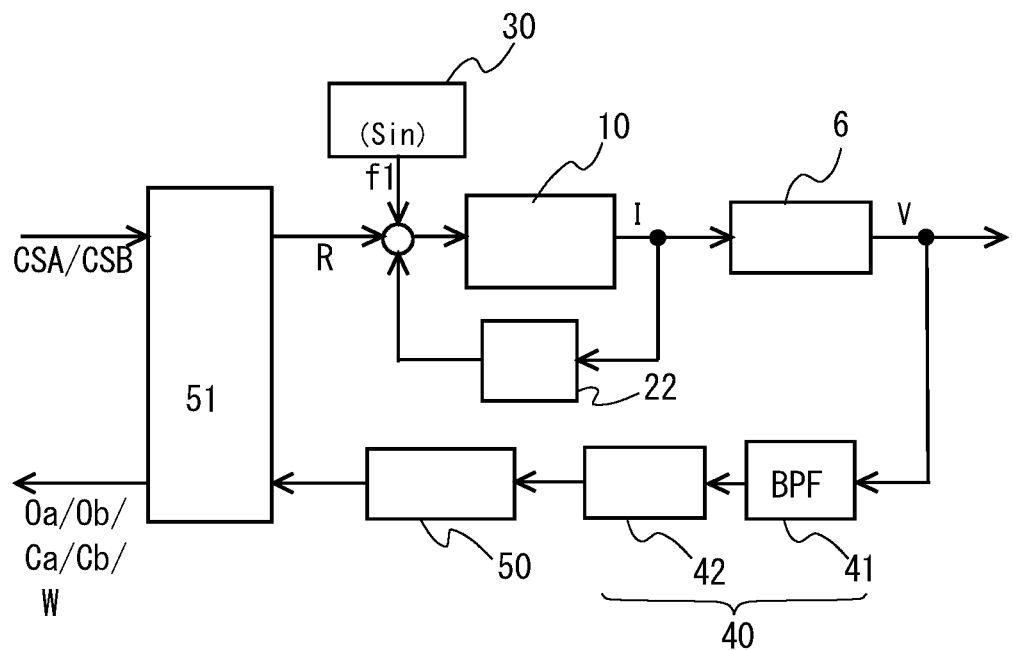
FIG. 4 is a conceptual diagram showing the procedures of determining the position of the valve spool by the electromagnetic switching-valve position detection system according to the practical example.

Another example of position detection and electric current control is shown in the time chart in FIG. 3(b). In this case, after the drive current at the rising edge is turned to a large electric current at 200% in response to the output of the solenoid drive command signal (CSA/CSB), situations continue in which the determination signal SD1 indicating the fully attracted state is not still obtained since the moving core fails to reach the fully attracted position, from the time when the determination signal SD2 indicating the valve opening position is obtained until the solenoid drive command signal (CSA/CSB) is stopped. In this case, the determination circuit 51 outputs the electric current command signal such that after maintaining the drive current in the high-speed section HS during the set time by a startup timer from the time of rising, it maintains the drive current at 100% without decreasing the drive current to the energy saving mode. While the determination signal SD1 indicating the fully attracted state of the moving core is not obtained, the determination circuit 51 outputs the alarm signal W by the alarm circuit 70. After the output of the solenoid drive command signal (CSA/CSB) is stopped, similarly to the case in FIG. 3(a) above, the drive current is reduced to 0%, and then, it is confirmed that the valve spool is at the valve closing position (VC).

Figure 3C:
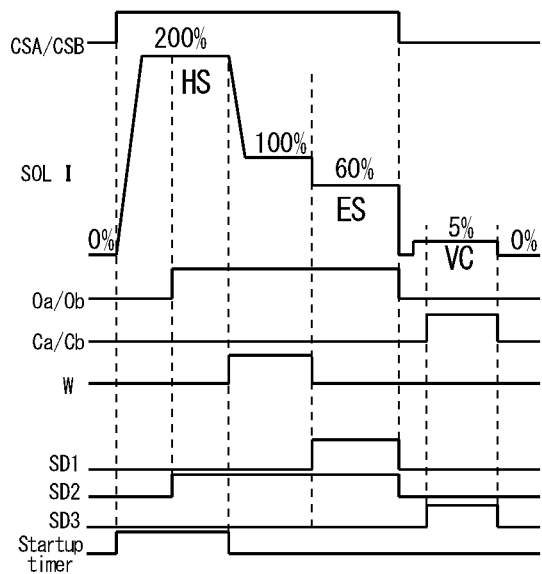
Figure 3D:
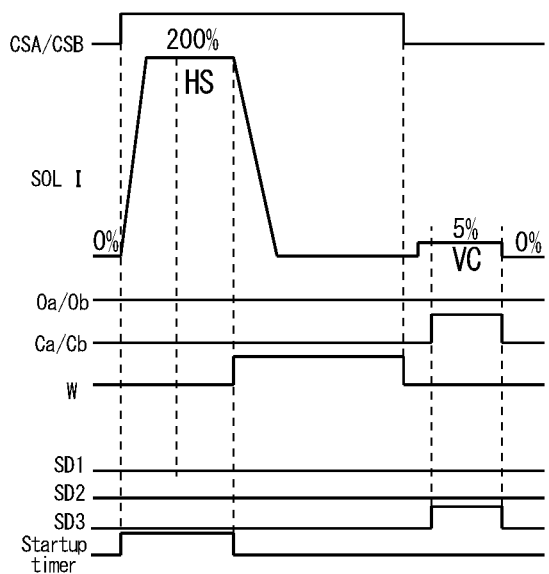

As shown in the time chart in FIG. 3(c), in the case in which the fully attracted state of the moving core is not obtained during the set time by the startup timer and the fully attracted state is obtained in a delay, the determination circuit 51 outputs an electric current command to still maintain the drive current at 100% after the high-speed section HS. And at the point in time when the determination signal SD1 indicating the fully attracted state of the moving core is outputted, an electric current command to decrease the drive current to 60% is in the energy saving mode is outputted. Here, the output of the alarm signal W is also released.

In some cases, some failure in the electromagnetic switching-valve 5 causes the moving core not to be attracted and moved even though carrying a current through the solenoid is started for excitation, and the valve spool fails to move to the valve opening position. In this case, as shown in the time chart in FIG. 3(d), even though the high-speed section HS is continued by the electric current command to set the drive current to a large electric current at 200% from the rising edge based on the output of the solenoid drive command signal (CSA/CSB), neither the determination signal SD1 indicating the fully attracted state of the moving core nor the determination signal SD2 indicating that the valve spool is reached at the valve opening position is obtained. In the case in which this situation continues even at the point in time after a lapse of the set time by the startup timer, the determination circuit 51 outputs an electric current command to turn off the drive current and carries no current through the solenoid. Thus, the solenoid into non-excitation state. After that, similarly, the determination circuit 51 outputs an electric current command to supply a low electric current, and confirms the valve closing position state of the valve spool (VC). When the valve closing position state of the valve spool can be confirmed by the determination signal SD3, the valve opening manipulation is again performed by the solenoid drive command signal. And if the same failure result as last time appears, the inspection and maintenance of the electromagnetic switching-valve 5 can be performed.

In the practical example above, as the carrier wave for position detection, the high frequency (a sine wave or a triangular wave) at the frequency f1=0.1 to 1 kHz can be used. With the use of such a high frequency carrier wave, the position of the valve spool was determined from the detection of the voltage amplitude of the solenoid. For the frequency range of the carrier wave, a frequency of 0.1 kHz is set as the lower limit below which the electromagnetic switching-valve might not respond, and a frequency of 1 kHz is set as the upper limit above which the influence of losses due to the magnetic material of the solenoid and the influence of the parasitic capacitance of the coil might be affected.

REFERENCE SIGNS LIST

1: Electromagnetic switching-valve position detection system
2: Supply power source
3: Control unit
5: Electromagnetic switching-valve
6: Solenoid
SOLa: First solenoid
SOLb: Second solenoid
10: Electric current control circuit
11: Bridge diode
12: Primary smoothing capacitor
13: P-ID control unit
14: Pulse signal generator
15: Primary switching element
16: Switching transformer
LP: Primary coil
LS1: First secondary coil
LS2: Second secondary coil
17A: First secondary circuit
17B: Second secondary circuit
18A: First secondary diode
18B: Second secondary diode
19A: First secondary smoothing capacitor
19B: Second secondary smoothing capacitor
20: Solenoid switching circuit
21A: First secondary switching element
21B: Second secondary switching element
22: Electric current sensor
30: high frequency carrier wave generator
f1: high frequency carrier wave
40: Detecting unit 41: Band-pass filter
42: Full-wave rectifier
50: Position determining unit
51: Determination circuit
60: Electric current switching circuit
70: Alarm circuit
D1: Fully attracted position reference value
D2: Valve opening position reference value
D3: Valve closing position reference value

The invention claimed is:

1. A system that detects a position of a valve spool of an electromagnetic switching-valve in which a moving core that is attracted and moved to a fixed core by an excitation of an energized solenoid displaces the valve spool to switch a passage of a hydraulic circuit, the system comprising:
an electric current control circuit including
a bridge diode into which an electric current from a power supply flows,
a primary smoothing capacitor configured to smooth a direct current from the bridge diode,
a switching transformer configured to transform a pulse wave alternating current which being converted from the direct current smoothed at the primary smoothing capacitor by switching between turning on and off of a switching element in a period based on a pulse signal generated by a pulse signal generator, into a predetermined alternating current voltage and transmit the predetermined alternating current voltage to a secondary side,
a secondary diode configured to rectify the alternating current transmitted to the secondary side, and
a secondary smoothing capacitor configured to further smooth and output the rectified direct current to the solenoid side;
a control unit configured to control switching between turning on and off the switching element by adjusting a pulse duration of the pulse signal by the pulse signal generator based on an electric current command based on a command signal and based on a detected result on an outputted side of the electric current control circuit;
a carrier wave generator configured to superimpose a high frequency carrier wave for position detection on a signal wave of the electric current command; and
a detecting circuit configured to extract a frequency component of the carrier wave for the position detection from a voltage feedback signal of the solenoid, detect a voltage amplitude from the frequency component, and obtain an amplitude signal based on the voltage amplitude, wherein the control unit further has
a position determining circuit configured to determine a position of the valve spool based on the amplitude signal and pre-set determination reference values corresponding to valve spool positions, and
a determination circuit configured to output a valve position signal based on the determination signal of the position determining circuit.

2. The electromagnetic switching-valve position detection system according to claim 1,
wherein the determination circuit includes an electric current switching circuit configured to decide a drive current for the solenoid based on the determination signal and the command signal and output an electric current command of the decided drive current.

3. The electromagnetic switching-valve position detection system according to claim 2,
wherein the determination circuit has, as the pre-set determination reference values of the valve spool positions,
a fully attracted position reference value corresponding to a threshold of a voltage amplitude when the moving core of the solenoid is reached at a fully attracted position to fixed core,
a valve opening position reference corresponding to a threshold of the voltage amplitude when the valve spool is reached at a valve opening position, and
a valve closing position reference value corresponding to a threshold of the voltage amplitude when the valve spool is reached at a valve closing position.

4. The electromagnetic switching-valve position detection system according to claim 3,
wherein: the system is a switching detection system including a pair of solenoids of a first solenoid and a second solenoid that have driving directions opposite to each other;
the switching transformer has one primary coil and two secondary coils that are a first secondary coil and a second secondary coil;
the system is provided with
a first secondary circuit having a first secondary diode configured to rectify an alternating electric current from the first secondary coil and a first secondary smoothing capacitor configured to further smooth the rectified direct current and output the direct current to the first solenoid,
a second secondary circuit having a second secondary diode configured to rectify an alternating electric current from the second secondary coil and a second secondary smoothing capacitor configured to further smooth the rectified direct current and output the direct current to the second solenoid, and
a first secondary switching element disposed on the first secondary circuit and a second secondary switching element disposed on the second secondary circuit; and
the control unit configured to control switching between drive of the first solenoid and drive of the second solenoid, by controlling the turning on and off the first secondary switching element and the second secondary switching element based on a command signal, and selecting electric current supply by the first secondary circuit or electric current supply by the second secondary circuit.

5. The electromagnetic switching-valve position detection system according to claim 2,
wherein the determination circuit includes an alarm circuit configured to output an alarm signal when a position of the valve spool is at an abnormal position.

6. The electromagnetic switching-valve position detection system according to claim 2,
wherein: the system is a switching detection system including a pair of solenoids of a first solenoid and a second solenoid that have driving directions opposite to each other;
the switching transformer has one primary coil and two secondary coils that are a first secondary coil and a second secondary coil;
the system is provided with
a first secondary circuit having a first secondary diode configured to rectify an alternating electric current from the first secondary coil and a first secondary smoothing capacitor configured to further smooth the rectified direct current and output the direct current to the first solenoid, a second secondary circuit having a second secondary diode configured to rectify an alternating electric current from the second secondary coil and a second secondary smoothing capacitor configured to further smooth the rectified direct current and output the direct current to the second solenoid, and a first secondary switching element disposed on the first secondary circuit and a second secondary switching element disposed on the second secondary circuit; and the control unit configured to control switching between drive of the first solenoid and drive of the second solenoid, by controlling the turning on and off the first secondary switching element and the second secondary switching element based on a command signal, and selecting electric current supply by the first secondary circuit or electric current supply by the second secondary circuit.

7. The electromagnetic switching-valve position detection system according to claim 1, wherein the determination circuit has, as the pre-set determination reference values of the valve spool positions, a fully attracted position reference value corresponding to a threshold of a voltage amplitude when the moving core of the solenoid is reached at a fully attracted position to fixed core, a valve opening position reference corresponding to a threshold of the voltage amplitude when the valve spool is reached at a valve opening position, and a valve closing position reference value corresponding to a threshold of the voltage amplitude when the valve spool is reached at a valve closing position.

8. The electromagnetic switching-valve position detection system according to claim 7, wherein the determination circuit includes an alarm circuit configured to output an alarm signal when a position of the valve spool is at an abnormal position.

9. The electromagnetic switching-valve position detection system according to claim 7, wherein: the system is a switching detection system including a pair of solenoids of a first solenoid and a second solenoid that have driving directions opposite to each other;

the switching transformer has one primary coil and two secondary coils that are a first secondary coil and a second secondary coil;

the system is provided with a first secondary circuit having a first secondary diode configured to rectify an alternating electric current from the first secondary coil and a first secondary smoothing capacitor configured to further smooth the rectified direct current and output the direct current to the first solenoid, a second secondary circuit having a second secondary diode configured to rectify an alternating electric current from the second secondary coil and a second secondary smoothing capacitor configured to further smooth the rectified direct current and output the direct current to the second solenoid, and a first secondary switching element disposed on the first secondary circuit and a second secondary switching element disposed on the second secondary circuit; and the control unit configured to control switching between drive of the first solenoid and drive of the second solenoid, by controlling the turning on and off the first secondary switching element and the second secondary switching element based on a command signal, and selecting electric current supply by the first secondary circuit or electric current supply by the second secondary circuit.

10. The electromagnetic switching-valve position detection system according to claim 1, wherein the determination circuit includes an alarm circuit configured to output an alarm signal when a position of the valve spool is at an abnormal position.

11. The electromagnetic switching-valve position detection system according to claim 10, wherein: the system is a switching detection system including a pair of solenoids of a first solenoid and a second solenoid that have driving directions opposite to each other;

the switching transformer has one primary coil and two secondary coils that are a first secondary coil and a second secondary coil;

the system is provided with a first secondary circuit having a first secondary diode configured to rectify an alternating electric current from the first secondary coil and a first secondary smoothing capacitor configured to further smooth the rectified direct current and output the direct current to the first solenoid, a second secondary circuit having a second secondary diode configured to rectify an alternating electric current from the second secondary coil and a second secondary smoothing capacitor configured to further smooth the rectified direct current and output the direct current to the second solenoid, and a first secondary switching element disposed on the first secondary circuit and a second secondary switching element disposed on the second secondary circuit; and the control unit configured to control switching between drive of the first solenoid and drive of the second solenoid, by controlling the turning on and off the first secondary switching element and the second secondary switching element based on a command signal, and selecting electric current supply by the first secondary circuit or electric current supply by the second secondary circuit.

12. The electromagnetic switching-valve position detection system according to claim 1, wherein: the system is a switching detection system including a pair of solenoids of a first solenoid and a second solenoid that have driving directions opposite to each other;

the switching transformer has one primary coil and two secondary coils that are a first secondary coil and a second secondary coil;

the system is provided with a first secondary circuit having a first secondary diode configured to rectify an alternating electric current from the first secondary coil and a first secondary smoothing capacitor configured to further smooth the rectified direct current and output the direct current to the first solenoid, a second secondary circuit having a second secondary diode configured to rectify an alternating electric current from the second secondary coil and a second secondary smoothing capacitor configured to further smooth the rectified direct current and output the direct current to the second solenoid, and a first secondary switching element disposed on the first secondary circuit and a second secondary switching element disposed on the second secondary circuit; and the control unit configured to control switching between drive of the first solenoid and drive of the second solenoid, by controlling the turning on and off the first secondary switching element and the second secondary switching element based on a command signal, and selecting electric current supply by the first secondary circuit or electric current supply by the second secondary circuit.

\* \* \* \* \*